US005943236A

United States Patent [19]
Ohno et al.

[11] Patent Number: 5,943,236
[45] Date of Patent: Aug. 24, 1999

[54] PLANT-OPERATION-INFORMATION DISPLAYING METHOD AND PLANT-OPERATION MONITORING APPARATUS

[75] Inventors: Hiroshi Ohno, Hitachinaka; Tetsuo Sato, Hitachi; Hiroshi Kobayashi, Hitachinaka, all of Japan

[73] Assignee: Hitachi, Ltd., Tokyo, Japan

[21] Appl. No.: 08/859,307

[22] Filed: May 20, 1997

[30] Foreign Application Priority Data

May 20, 1996 [JP] Japan .................................. 8-124787

[51] Int. Cl.$^6$ ...................................................... G06F 19/00
[52] U.S. Cl. ...................... 364/468.15; 364/189; 702/81; 702/182; 345/961; 345/965; 345/966; 345/968
[58] Field of Search ............................... 364/468.15, 184, 364/185, 188, 189, 468.16, 468.17; 702/182, 183, 1, 81, 84; 345/961, 965, 966, 968, 970, 326, 339, 348

[56] References Cited

U.S. PATENT DOCUMENTS

| | | | |
|---|---|---|---|
| 4,644,478 | 2/1987 | Stephens et al. | 364/185 X |
| 4,858,152 | 8/1989 | Estes et al. | 364/185 X |
| 5,581,242 | 12/1996 | Arita et al. | 340/691 |
| 5,689,416 | 11/1997 | Shimizu et al. | 364/185 |

FOREIGN PATENT DOCUMENTS

5-189679  7/1993  Japan .
6-59646   3/1994  Japan .

*Primary Examiner*—William Grant
*Assistant Examiner*—Victoria Robinson
*Attorney, Agent, or Firm*—Kenyon & Kenyon

[57] ABSTRACT

A large amount of information on unsteady events each occurring at a plant at a time not predicted by the user is superposed on contents of a display of existing drawings in a form that allows the information to be recognized by the sense of sight with ease. When an unsteady event such as an alarm related to an object, represented by an existing figure on a picture, being monitored at the plant occurs, the unsteady event is represented by a balloon-like figure newly drawn in an unsteady-event display on the picture. Then, in order to show that the unsteady event is related to the monitored object represented by the existing figure, the balloon-like figure is connected to the existing figure by a straight line which serves as a string tied to the balloon. Inside the balloon-like figure, a string of characters is displayed for explaining the unsteady event. When a confirming operation is carried out by the user to acknowledge the occurrence of the unsteady event, the drawing of the unsteady event changes to another balloon-like figure which has an attribute representing the completion of processing of the confirming operation. It is not until a solution to the occurring unsteady event found later that the other balloon-like figure disappears.

7 Claims, 8 Drawing Sheets

| OBJECT BEING MONITORED | DISPLAY POSITION OF THE UNSTEADY-EVENT NOTIFYING FIGURE | DEGREE OF SEVERENESS | DISPLAY STATE | DESCRIPTION OF THE UNSTEADY EVENT |
|---|---|---|---|---|
| Pump2(540,128) | (600,110,610,120) | 7 | a | POWER SUPPLY DOWN  13:48 |
| Pump1(120,240) | (150,220,160,280) | 3 | b | LOW PRESSURE  14:09 |
|  |  |  |  |  |

| NO. | OBJECT BEING MONITORED | DISPLAY POSITION OF THE UNSTEADY-EVENT NOTIFYING FIGURE | DEGREE OF SEVERENESS | SEQUENCING STATUS | DESCRIPTION OF THE UNSTEADY EVENT |
|---|---|---|---|---|---|
| 1 | Pump1(120,240) | (150,220,160,230) | 3 | N | LOW PRESSURE  14:08 |
| 2 | Pump2(540,128) | (600,110,610,120) | 9 | Y | POWER SUPPLY DOWN  13:48 |
| 3 | Pump1(120,240) | (150,220,160,230) | 8 | Y | HIGH TEMPERATURE  14:09 |
| 4 | Pump2(540,128) | (610,120,620,130) | 8 | Y | HIGH TEMPERATURE  13:55 |
| 5 | Pump2(540,128) | (620,130,630,140) | 7 | Y | ABNORMAL ROTATIONAL SPEED  13:47 |
|  |  |  |  |  |  |

PLANT-OPERATION-INFORMATION DISPLAYING METHOD AND PLANT-OPERATION MONITORING APPARATUS

BACKGROUND OF THE INVENTION

The present invention relates to an information displaying method and a plant-operation monitoring apparatus for monitoring plant operations. In particular, the present invention relates to a method for displaying information on an unsteady event such as an alarm.

Traditionally, information on plant operations comprising drawings and texts is displayed on a picture. When an unsteady event such as an alarm occurs at an unexpectable time, in order to indicate that the event is associated with a figure illustrating a normal condition on the picture, the figure is put in a blinking state or shown in a different color.

A string of characters describing details of the unsteady event is also displayed at a location in close proximity to the figure related to the unsteady event or at a specific location on the displayed picture along with the name of an object relevant to the occurring unsteady event.

In the display of such a conventional plant monitoring picture, the number of displayed items is limited by the display area and, in addition, a relation with a figure showing an object normally being monitored is not clear.

Moreover, when the figure of a monitored object is put in a blinking state to display the occurrence of an unsteady event, there is a shortcoming that it is difficult to recognize the blinking figure because, the more complex the picture drawn in advance, the smaller the individual picture elements. Furthermore, even though a notification of the occurrence of an unsteady event based on a blinking figure allows a relation between the occurrence of the unsteady event with the figure drawn in advance to be confirmed, it is difficult to understand information more detailed than the relation by merely seeing the displayed picture at a glance.

These problems serve as a big hindrance to plant operation monitoring in which it is necessary to immediately obtain information on circumstances of the plant in the abnormal occurrence of an alarm or the like.

As described above, an explanation by using a string of characters may be added to the picture for compensating the display for such an inadequate amount of information by adopting a technique of displaying such an explanatory string of characters at a location in a close proximity to a pre-drawn figure related to the occurring unsteady event. In this case, however, it becomes difficult to distinguish the explanatory string of characters from other character strings which are displayed continuously. With the technique for displaying an explanatory string of characters at a specific location on the picture, on the other hand, the name of an object must be displayed as another string of characters to indicate the relation with a pre-drawn figure relevant to the occurring unsteady event, making it also difficult to understand the relation by the sense of sight at a glance. These problems also serve as a hindrance to an attempt made to understand the displayed information quickly.

There may be a case in which the operation of a plant needs to be continued even if an unsteady event occurs. In this case, it is necessary to continuously display the alarm of the unsteady event on the picture, even after the user confirms the alarm notification, till the abnormal state is removed. In order to meet such a requirement, it is necessary in some cases to display a number of unsteady event notifications simultaneously on the picture. Once a blinking state has been terminated, however, figures already drawn on the picture can be distinguished from each other only by colors. In addition, if the technique for displaying a string of characters on a specific area of the picture is adopted, there is a limit on the number of character strings that can be displayed. With the technique for displaying a notification at a place in close proximity to an already drawn figure, on the other hand, there is raised a problem that, the greater the number of displayed notifications, the more difficult the notifications to distinguish from the continuously displayed character strings. As a result, the notifications of unsteady events serve as a hindrance to the display of information other than the unsteady events.

An example of a technique for displaying information on a unsteady event occurring at a plant is disclosed in Japanese Patent Laid-open No. Hei 4-269626.

SUMMARY OF THE INVENTION

It is thus an object of the present invention to provide a plant-operation monitoring apparatus for drawing information input from a plant continuously on a plant-operation monitoring picture as a set of a plurality of figures and character strings accompanying the figures by means of a technique for displaying a large amount of information on an unsteady event occurring at the plant at a time unexpectable by the user whereby the information is superposed on existing drawings of a displayed picture in a form that allows the information to be recognized by the sense of sight with ease.

In order to achieve the object described above, the present invention provides a plant-operation monitoring apparatus comprising a plant-information gathering apparatus for continuously inputting information on plant operations from the plant and a user-input processing apparatus for inputting information on confirming operations carried out by the user.

Furthermore, a plant-operation monitoring apparatus is also provided with:

- a means for notifying the user of an unsteady event occurring at a plant at an unexpectable time along with a relation to one of figures already drawn on a plant-operation monitoring picture to represent a monitored object relevant to the unsteady event;
- a processing memory for storing data of three pictures: a normal-operation information picture, a confirmed unsteady event display picture and an unconfirmed unsteady event display picture;
- a normal-operation information data/picture processing means, a confirmed unsteady event display data/picture processing means and an unconfirmed unsteady event display data/picture processing means for processing input data in order to create data for the normal-operation information picture, the confirmed unsteady event display picture and the unconfirmed unsteady event display picture respectively;
- a data base, a confirmed unsteady event list and an unconfirmed unsteady event list for storing data of the normal-operation information data/picture processing means, the confirmed unsteady event display data/picture processing means and the unconfirmed unsteady event display data/picture processing means respectively;
- a normal-operation information processing wait data queue for storing a queue of pieces of normal-operation information to be output to the normal-operation information data/picture processing means;

a confirmed unsteady event processing wait data queue for storing a queue of pieces of normal-operation information, unsteady-event extinction information and moving-operation information to be output to the confirmed unsteady event display data/picture processing means;

an unconfirmed unsteady event processing wait data queue for storing a queue of pieces of normal-operation information, unsteady-event occurrence information and confirming-operation information to be output to the unconfirmed unsteady event display data/picture processing means; and a picture-synthesis processing means for drawing a final picture by synthesizing data of the normal-operation information picture, the confirmed unsteady event display picture and the unconfirmed unsteady event display picture.

The means for notifying the user draws a separate unsteady-event notifying figure representing description of an unsteady event occurring at a plant. In accordance with the description of the unsteady event, the means also determines the shape, the color and the hierarchical relation with existing figures for the unsteady-event notifying figure. A figure such as a line connecting the unsteady-event notifying figure to an existing figure representing an object being monitored at the plant is also drawn at the same time to indicate the association of the unsteady event with the object. The size or the position of the unsteady-event notifying figure is dynamically changed until the user confirms the occurrence of the unsteady event.

When the occurrence of an unsteady event at the plant is reported to the user on a plant-operation monitoring picture along with the association of the unsteady event with a monitored object represented by a figure already drawn on the plant-operation monitoring picture, an unsteady-event notifying figure having an attribute representing the description of the unsteady event and a string of character describing the unsteady event are drawn. At the same time, a string connecting the unsteady-event notifying figure to the existing figure representing the monitored object relevant to the unsteady event is drawn to indicate the association of the unsteady event with the monitored object. The size of the unsteady-event notifying figure is dynamically changed till the user carries out an operation to confirm the occurrence of the unsteady event.

By selecting a shape, a color and a hierarchical relation with existing figures for an unsteady-event notifying figure in advance in accordance with the description of the unsteady event as described above, the unsteady-event notifying figure can be clearly distinguished from figures normally drawn to represent objects being monitored, allowing a large amount of information to be displayed at the same time. In addition, pieces of information on unsteady events can be shown to the user on a priority basis starting with a severest unsteady event. In addition, since the balloon-like figure representing an unsteady event is linked to an existing figure representing an object being monitored on such a displayed picture as described above, the occurrence of the unsteady event as well as the association of the unsteady event with the object being monitored can be recognized by the user with ease. Further, since the unsteady-event notifying figure is dynamically changed till the user carries out an operation to confirm the occurrence of the unsteady event, the displayed picture draws the user's attention, allowing the time to such a confirming operation to be shortened.

BRIEF DESCRIPTION OF THE DRAWINGS

Embodiments of the present invention will be described by referring to figures some of which show the embodiments wherein.

DETAILED DESCRIPTION OF THE PREFERRED EMBODIMENTS

The present invention will become more apparent from a study of the following detailed description of preferred embodiments with reference to the accompanying diagrams some of which show the embodiments.

Figure 1:
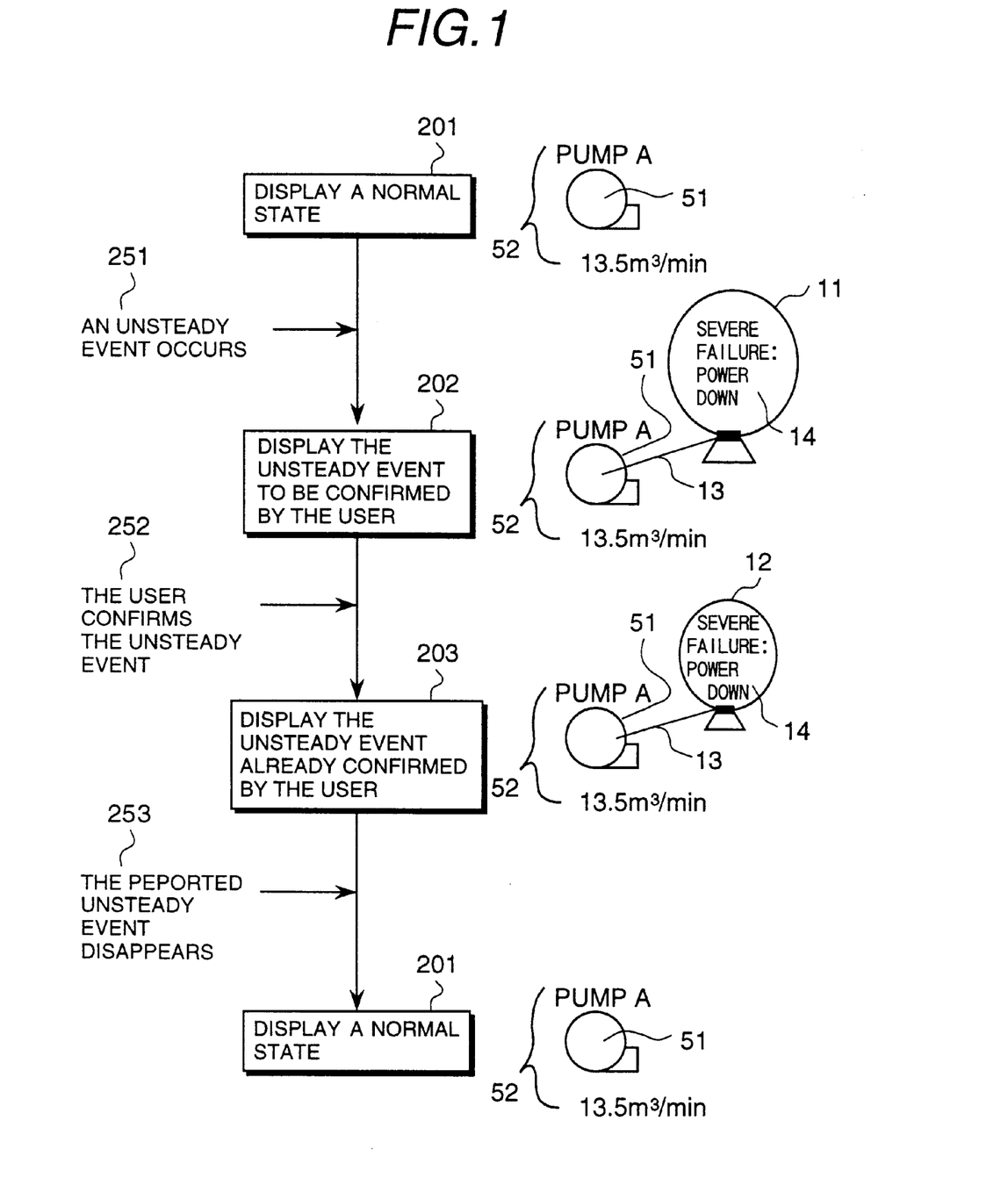
FIG. 1 is a diagram showing an order of drawing adopted by an embodiment of the present invention and examples of figures drawn in the order.

FIG. 1 is a diagram showing an order of drawing adopted by an embodiment of the present invention and examples of figures drawn in the order. Reference numeral 51 shown in FIG. 1 is a figure illustrating an object being monitored at a plant. Reference numeral 52 is a string of characters appended to the figure 51 showing the object being monitored. In the display of a normal state 201, the picture displays a combination of a figure showing an object being monitored and a string of characters appended to the figure in this way. Now, consider a transition 251 from the normal state 201 to an abnormal state 202 in which an unsteady event such as an alarm occurs. In the abnormal state 202, a balloon-like figure 11 is drawn to represent the occurring unsteady event. Then, in order to show that the unsteady event is related to the figure 51 drawn in advance, the balloon-like figure 11 is connected to the figure 51 by a straight line 13 which depicts a string tied to the balloon. Inside, the balloon-like figure 11, a string of characters 14 is displayed for explaining the unsteady event.

When a confirming operation 252 is carried out by the user to confirm the occurrence of the unsteady event, the balloon-like figure 11 illustrating the unsteady event does not disappear immediately. Instead, the drawing of the unsteady event changes to a balloon-like figure 12 which has an attribute representing the completion of the confirmation. It is not until a solution 253 to a problem resulting in the occurring unsteady event found later that the balloon-like figure 12 which has an attribute representing the completion of the confirmation disappears, restoring the picture to the display of the normal state 201.

Figure 2:
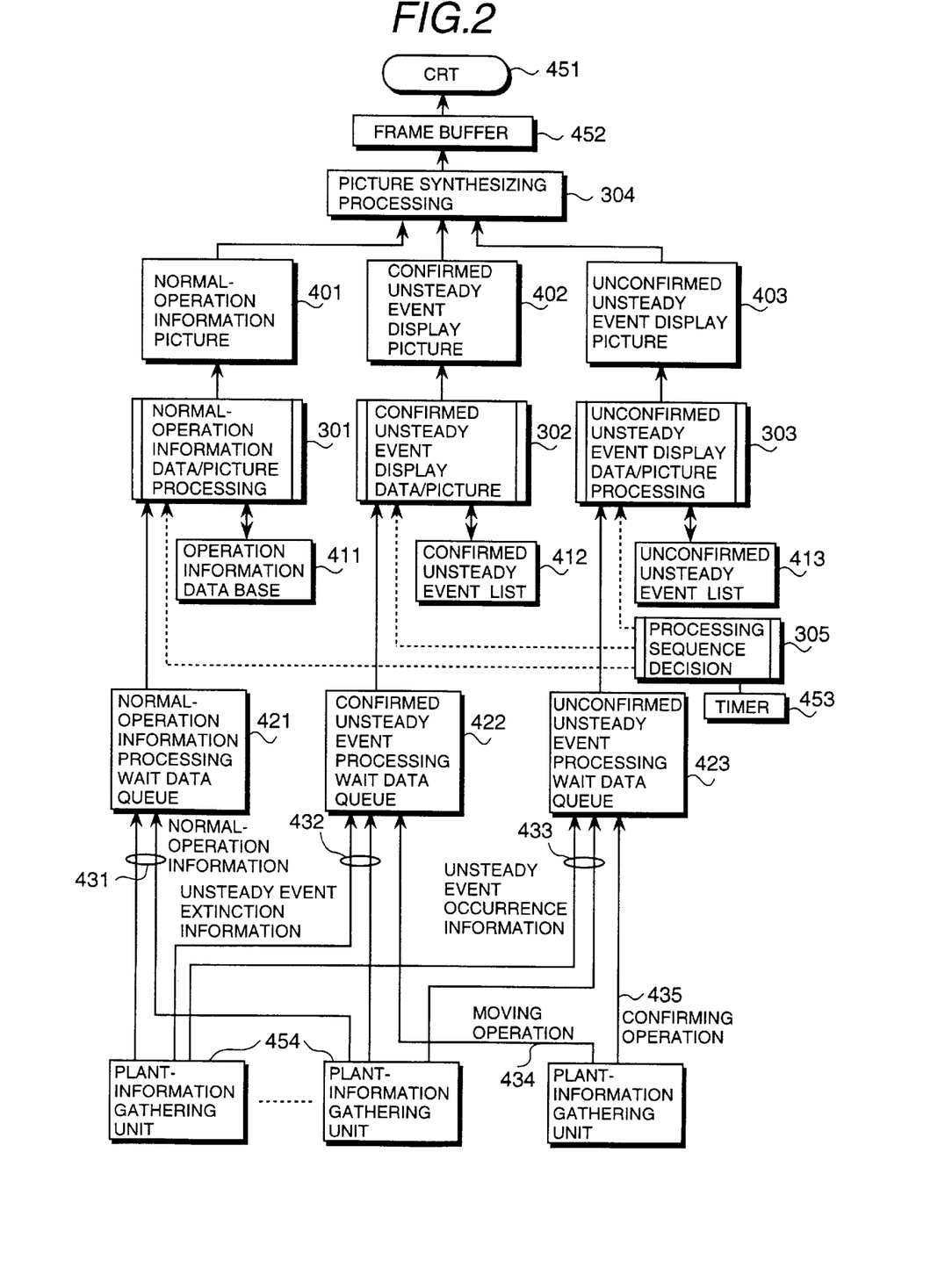
FIG. 2 is a diagram showing the configuration of a monitoring apparatus for carrying out display operations as implemented by an embodiment of the present invention.

FIG. 2 is a diagram showing the configuration of a monitoring apparatus for carrying out display operations shown in FIG. 1. As shown in the figure, the monitoring apparatus employs a frame buffer 452 for accumulating data to be displayed to the user and a CRT 451 for actually displaying a picture as an output unit.

A plant-information gathering unit 454 is used as an input unit. The plant-information gathering unit 454 transmits normal plant-operation information 431 and information on an unsteady event occurring at a plant to the monitoring apparatus. In addition, a user-input processing unit 455 is also connected to the monitoring apparatus. The user-input processing unit 455 processes an interactive operation carried out by the user, supplying results of the processing to the monitor apparatus. Examples of the interactive operation are a mouse operation and a touch-picture operation.

Stored in a processing memory unit which is not shown in the figure illustrating the monitor apparatus is data for three pictures: a normal-operation information picture 401, a confirmed unsteady event display picture 402 and an unconfirmed unsteady event display picture 403. There are also provided normal-operation information data/picture processing 301, confirmed unsteady event display data/picture processing 302 and unconfirmed unsteady event display data/picture processing 303 for processing input data in order to create data for the normal-operation information picture 401, the confirmed unsteady event display picture 402 and the unconfirmed unsteady event display picture 403 respectively. The data/picture processings 301, 303 and 303 are provided with processing wait data queues 421, 422 and 423 respectively.

The normal-operation information data/picture processing 301, the confirmed unsteady event display data/picture processing 302 and the unconfirmed unsteady event display data/picture processing 303 are also provided with a data base 411 for storing normal-operation information, a confirmed unsteady event list 412 for holding confirmed unsteady events and an unconfirmed unsteady event list 413 for holding unconfirmed unsteady events respectively. The operation-information data base 411, the confirmed unsteady event list 412 and the unconfirmed unsteady event list 413 are used for accumulating data to be processed in the normal-operation information data/picture processing 301, the confirmed unsteady event display data/picture processing 302 and the unconfirmed unsteady event display data/picture processing 303 respectively. Processing sequence decision 305 receives time information from a timer 453, requesting the start and the end of the normal-operation information data/picture processing 301, the confirmed unsteady event display data/picture processing 302 and the unconfirmed unsteady event display data/picture processing 303.

A processing procedure adopted in the configuration described above is explained in terms of flows of data as follows. First of all, data from the plant-information gathering unit 454 is distributed among the normal-operation information data/picture processing 301, the confirmed unsteady event display data/picture processing 302 and the unconfirmed unsteady event display data/picture processing 303 to undergo proper data/picture processing therein by way of the processing wait data queues 421, 422 and 423 respectively depending upon the contents of the data. The normal-operation information 431 is transmitted to the monitoring apparatus continuously and stored in the operation-information data base 411 by the normal-operation information data/picture processing 301. A normal-operation information picture 401 is then created from data stored in the operation-information data base 411.

In the unconfirmed unsteady event display data/picture processing 303, unsteady event occurrence information 433, that is, information on generation of an unsteady event at the plant, is stored on the unconfirmed unsteady event list 413 and used for creating an unconfirmed unsteady event display picture 403. Later on, when information on a confirming operation 435 to confirm an unconfirmed unsteady event being displayed is received from the user-input processing unit 455, the unconfirmed unsteady event display data/picture processing 303 deletes information on the unsteady event just confirmed from the unconfirmed unsteady event list 413, transferring the deleted information to the confirmed unsteady event list 412.

In the confirmed unsteady event display data/picture processing 302, a confirmed unsteady event display picture 402 is created from information stored on the confirmed unsteady event list 412. When the user specifies a moving operation 434, moving processing is carried out on the display of the confirmed unsteady event. Unsteady event extinction information 432, that is, information on extinction of a confirmed unsteady event, causes the figure of the confirmed unsteady event and information on the confirmed unsteady event to be deleted from the confirmed unsteady event display picture 402 and the confirmed unsteady event list 412 respectively. It should be noted that the unsteady event extinction information 432 indicates that the unsteady event related to an object being monitored at the plant has disappeared.

In the method for displaying an unsteady event provided by the present embodiment, the amount of figure drawing work increases as the amount of information to be displayed increases. It is thus necessary to set such proper drawing timing that no delay of an alarm of the like results in displaying the alarm. In the present embodiment, interlocked with the timer 453, the processing sequence decision 305 makes a decision as to which of the normal-operation information data/picture processing 301, the confirmed unsteady event display data/picture processing 302 and the unconfirmed unsteady event display data/picture processing 303 is to be executed, sending a command to carry out the processings 301, 302 or 303 as indicated by a dotted line in FIG. 2.

In picture synthesizing processing 304 for combining the normal-operation information picture 401, the confirmed unsteady event display picture 402 and the unconfirmed unsteady event display picture 403, a final picture is created by superposing the normal-operation information picture 401, the confirmed unsteady event display picture 402 and the unconfirmed unsteady event display picture 403 in an order these pictures are enumerated so that, in the final picture, the normal-operation information picture 401 is seen as a rear-most picture whereas the unconfirmed unsteady event display picture 403 is seen as a front-most picture. In actuality, the final picture is obtained as follows. Changed contents of areas on the normal-operation information picture 401, the confirmed unsteady event display picture 402 and the unconfirmed unsteady event display picture 403 are copied in the frame buffer 452 in an order these pictures are enumerated so that, in the case of a picture area overlapping each other, the contents of the overlapping area copied last are written over the coinciding areas on the other pictures copied earlier.

In addition, in the picture synthesizing processing 304, only an area on the pictures with the contents thereof changed is extracted to produce a synthesized final picture. For example, after a new balloon-like figure has been drawn, a rectangular area which covers center coordinates of a figure showing the object being monitored and the coordinates of all the diagonal vertexes of a rectangle enclosing the balloon-like figure is used as an area to be re-drawn.

Figure 3:
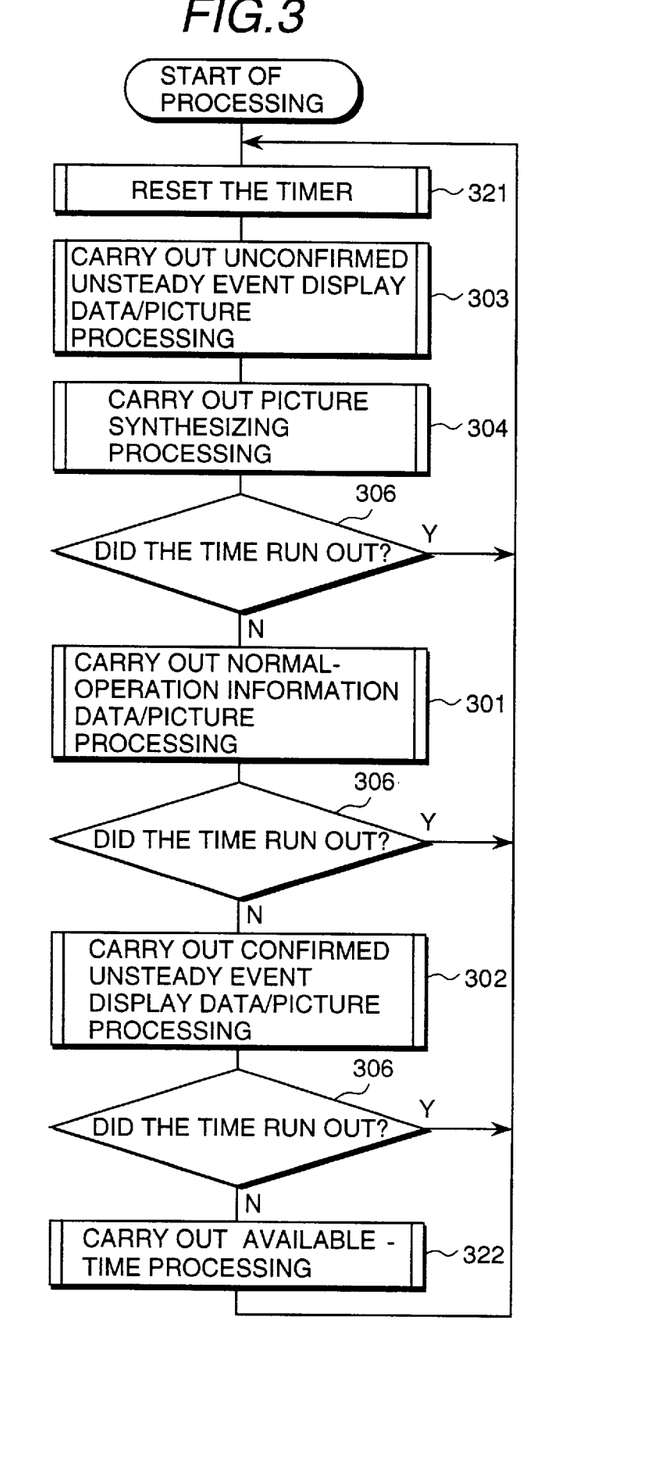
FIG. 3 is an explanatory diagram showing the flow of a procedure of the overall processing sequence decision provided by the present invention.

FIG. 3 is an explanatory diagram showing the flow of a procedure of the overall processing sequence decision. In the processing sequence decision, information having a high degree of severeness must be always displayed in a predetermined time. Thus, pieces of processing are carried out on a priority basis starting with the one having the highest priority. As shown in the figure, as a predetermined processing time lapses, the rest of the processing is left unexecuted. In order to implement such a scheme, in the processing sequence decision, the timer 453 is reset at the beginning of each processing period at a first step 321 of the processing flow to start measurement of the lapse of time.

Then, the severest unconfirmed unsteady event display data/picture processing 303 is executed first before carrying out the picture synthesizing processing 304 to display an unconfirmed occurring unsteady event. The processing flow then goes on to a step 306 to check whether or not the predetermined processing time has lapsed. If the predetermined processing time has not lapsed yet, then the normal-operation information data/picture processing 301 is performed. The processing flow then proceeds to another step 306 to check whether or not the predetermined processing time has lapsed. If the predetermined processing time still has not lapsed yet, then the confirmed unsteady event display data/picture processing 302 is carried out. The processing flow then continues to the last step 306 to check whether or not the predetermined processing time has lapsed. If the predetermined processing time still has not lapsed yet, then available-time processing 322 is executed. Concretely speaking, confirmed unsteady events are put in a sequence in the available-time processing 322 as will be described later.

Figure 4:
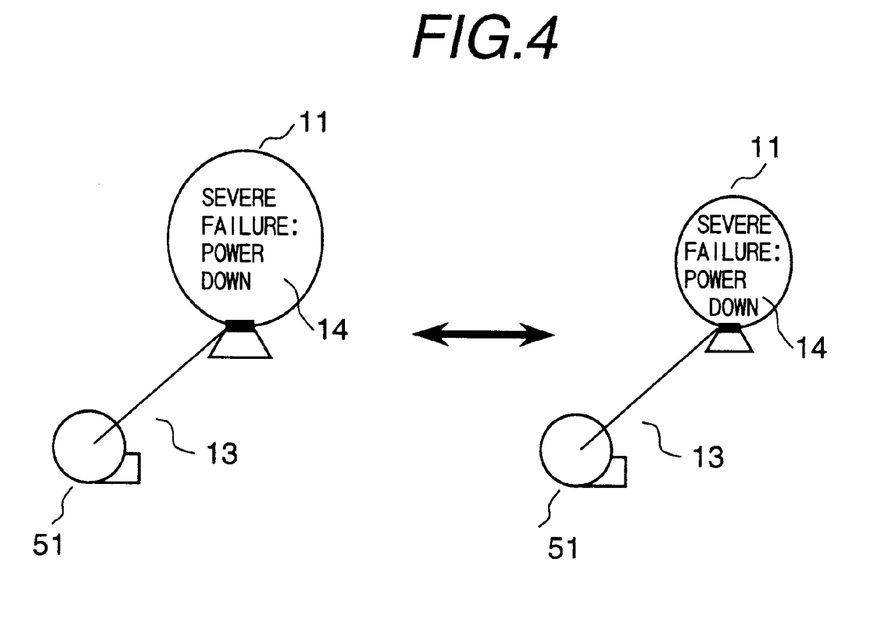
FIG. 4 is an explanatory diagram showing a method of drawing a dynamically changing figure of an unconfirmed unsteady event provided by the present invention.
Figure 5:
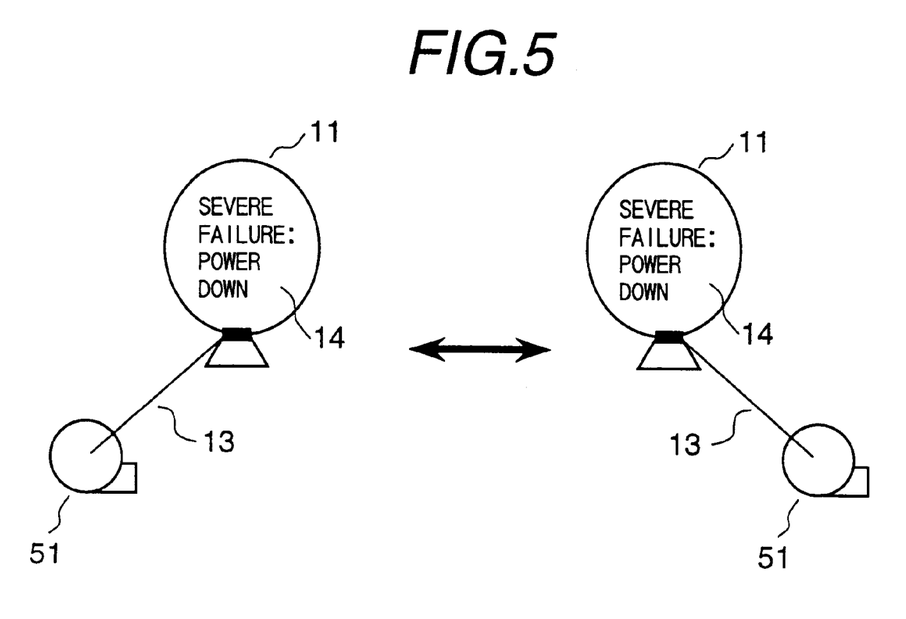
FIG. 5 is an explanatory diagram showing another method of drawing a dynamically changing figure of an unconfirmed unsteady event provided by the present invention.

FIGS. 4 and 5 are each an explanatory diagram showing a method of drawing information on an unconfirmed unsteady event during a time up to confirmation by the user of the occurrence of the unsteady event. In the FIG. 11 representing an unsteady event not unconfirmed yet, it is desirable to select an attribute which is capable of notifying the user of the occurrence of the unsteady event quickly. As one of such attributes, the size of the figure indicating the occurrence of the unsteady event is dynamically changed with the lapse of time as shown in FIG. 4.

There is also another drawing method in which the display position of the balloon-like figure 11 indicating an unsteady event is shaken as shown in FIG. 5. Even if the displayed FIG. 11 is moving, the string-like figure 13 illustrating a string tied to the balloon clearly shows a relation with a figure 51 which represents an object being monitored. As a result, a shaking figure does not have any effect on the recognition of, among other things, a place or a monitored object at which an unsteady event has occurred.

Figure 6:
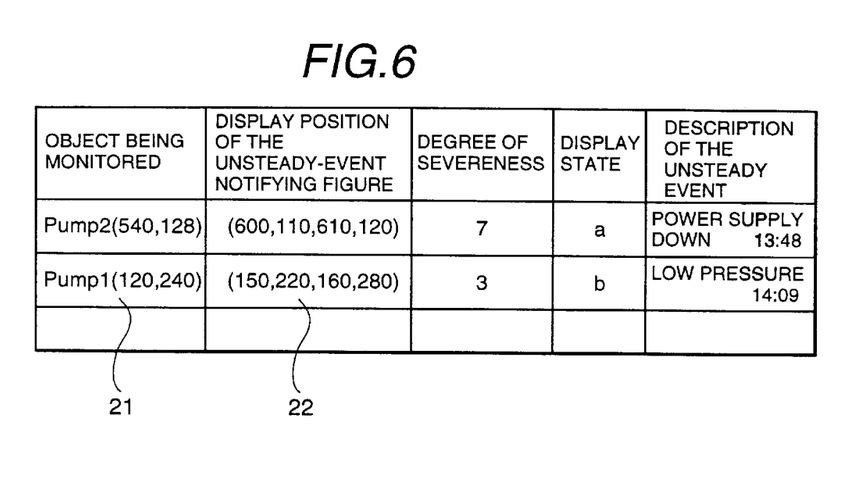
FIG. 6 is a diagram showing the structure of a list of unconfirmed unsteady events provided by the present invention.

FIG. 6 is a diagram showing the structure of the unconfirmed unsteady event list 413, a list of unconfirmed unsteady events. As shown in the figure, each entry of the list is allocated to the occurrence of an unsteady event. In addition to the description of the unsteady event, each entry includes a field 21 for describing a monitored object related to the unsteady event and the display position of the object on a screen, a field 22 for describing the drawing position of a figure notifying the occurrence of the unsteady event on the screen, the degree of severeness of the occurring unsteady event and the display state of the figure notifying the occurrence of the unsteady event. The description of the unsteady event includes details such as the occurrence time and other information required for control purposes. Unsteady events are cataloged on the list in a chronological order in which the unsteady events occur, that is, on a first-come-first-listed basis. A newly occurring unsteady event is added sequentially to the list after the unsteady events cataloged on the list earlier.

Positions on the picture at which figures are to be drawn are determined by information on display positions 21 and 22 which indicate where the figures are to be drawn in the event of an unsteady event. A drawing attribute is determined by data indicating the degree of severeness of the unsteady event. In the case of an unsteady-event notifying figure which is changed dynamically as shown in FIGS. 4 and 5, the information on the display state of the unsteady-event notifying figure includes an attribute used in the previous drawing. Then, each time the unconfirmed unsteady event display data/picture processing 303 is carried out, the information on the display state of the unsteady-event notifying figure is updated with an attribute used in the current drawing. In this way, a dynamically changing display can be implemented.

Figure 7:
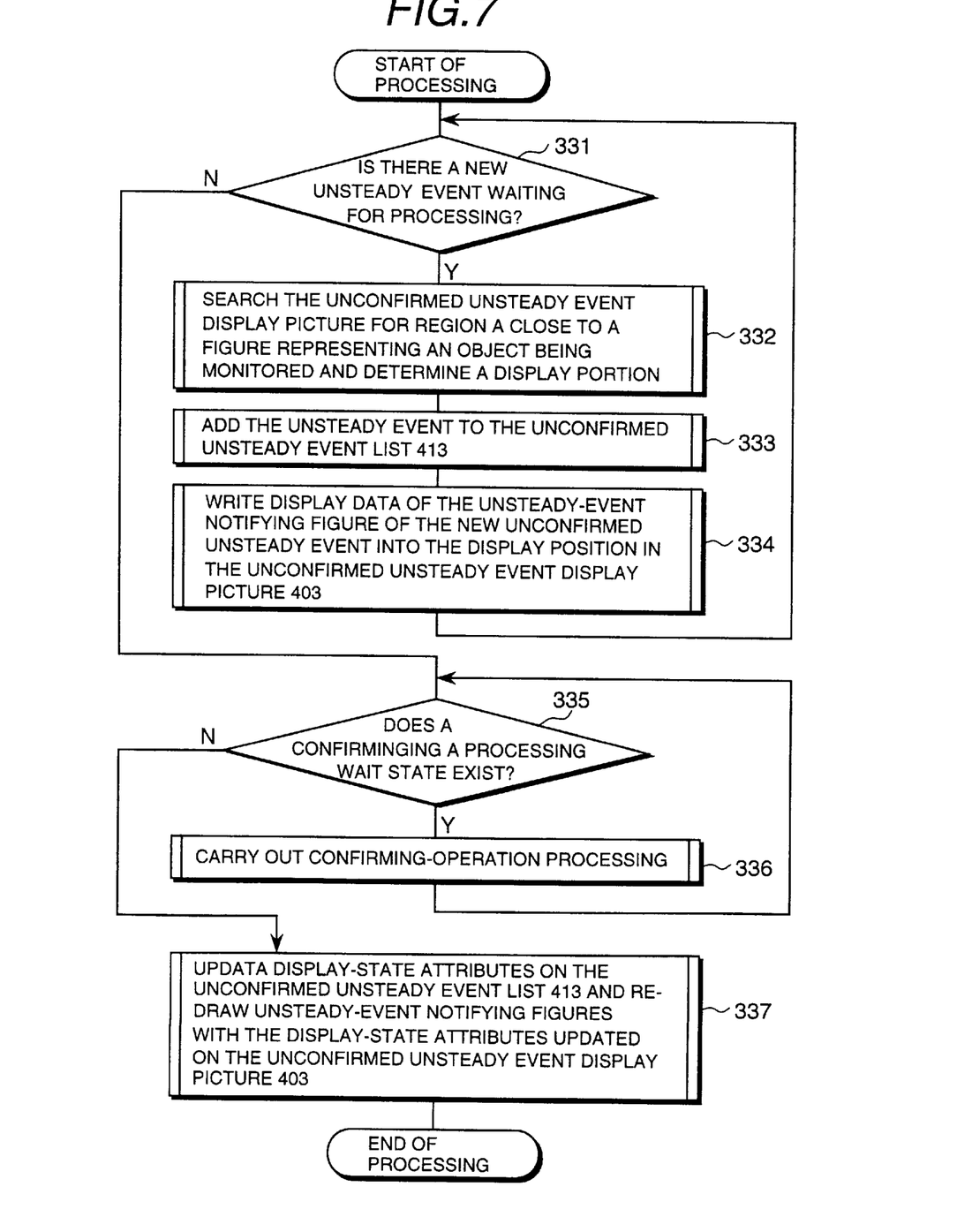
FIG. 7 is an explanatory diagram showing the flow of a procedure for processing an unconfirmed unsteady event provided by the present invention.

FIG. 7 is an explanatory diagram showing data of an unconfirmed unsteady event and the flow of a detailed procedure of the unconfirmed unsteady event display data/picture processing 303. As shown in the figure, the processing flow begins with a step 331 at which the processing wait data queue 423 is examined in order to find out whether or not unsteady event occurrence information 433, that is, information on generation of an unsteady event newly occurring at the plant, waiting for processing has arrived from the plant-information gathering unit 454. If a new unsteady event waiting for processing exists, that is, each time a new unsteady event occurs, the processing flow goes on to a step 332 at which the unconfirmed unsteady event display picture 403 is searched for an undrawn region having an area equal to a rectangular region adjacent to the unsteady-event notifying FIG. 11 of an existing unconfirmed unsteady event in order to allocate a display position to the new unconfirmed unsteady event. This is because the figures of all unconfirmed unsteady events are each regarded as a display with a high degree of severeness, requiring display positions which do not overlap each other. The search for an undrawn region is carried out by taking, as a center, a figure representing a monitored object in which the new unsteady event occurs. The search is executed in a direction gradually departing from the center, that is, the figure representing the object being monitored. An undrawn region found first is used as a display position.

It should be noted that there is also a search technique whereby an undrawn region at a coinciding position on both the unconfirmed unsteady event display picture 403 and the normal-operation information picture 401 is searched for so as to prevent an unsteady-event notifying figure from being drawn over figures representing objects being monitored.

The processing flow then continues to a step 333 at which information on the new unconfirmed unsteady event is added to the beginning of an available area in the unconfirmed unsteady event list 413, that is, an entry following the end of the already recorded area. The processing flow further proceeds to a step 334 at which display data of the unsteady-event notifying figure of the new unconfirmed unsteady event is written into the display position in the unconfirmed unsteady event display picture 403 determined at the step 332. The processing flow then returns to the step 331.

If a new unsteady event waiting for processing is not found on the processing wait data queue 423 at the step 331, on the other hand, the processing flow goes on to a step 335 to find out whether or not a confirming operation in a processing wait state exists, that is, whether or not a confirming operation 435 entered via the user input processing unit 455 has been put on the processing wait data queue 423. If a confirming operation in a processing wait state exists on the processing wait data queue 423, the processing flow continues to a step 336 at which confirming-operation processing is carried out for the confirming operation. The processing flow then returns to the step 335 for another confirming operation. As a confirming operation does not exist on the processing wait data queue 423 any more, the processing flow goes on to a step 337 at which all display-state attributes on the unconfirmed unsteady event list 413 are updated and unsteady-event notifying figures with the display-state attributes updated are re-drawn on the unconfirmed unsteady event display picture 403 in order to provide dynamic changes to the unsteady-event notifying figures. If the display-state attribute provides a change in size as shown in FIG. 4, a magnitude is recorded on the unconfirmed unsteady event list 413 as a symbol representing the magnitude at some levels. If the display-state attribute provides a shaking effect as shown in FIG. 5, on the other hand, an amount of figure movement is similarly recorded on the unconfirmed unsteady event list 413 also as a symbol representing the amount of figure movement at some levels.

It should be noted that the final picture synthesizing processing 304 is carried out once at the end of the unconfirmed unsteady event display data/picture processing 303 as shown in FIG. 3 instead of performing the final picture synthesizing processing 304 in the course of execution of the unconfirmed unsteady event display data/picture processing 303. In this way, processing to update an overlapping re-drawn area repeatedly does not take place, allowing the drawing speed to be increased.

In the processing of a confirming operation 435 carried out at the step 336, pointer position information is used. The pointer position information which indicates a click position of a mouse or a touch position on a touch panel is included in information of the confirming operation 435. The pointer position information is used for examining whether or not a pointer position on the picture including a figure being confirmed indicates a drawing position of an unsteady-event notifying figure of an unsteady event existing on the unconfirmed unsteady event list 413. If an unsteady event with the drawing position of the notification figure thereof indicated by the pointer position does not exist on the unconfirmed unsteady event list 413, the processing of the confirming operation is terminated. If such an unsteady event exists on the unconfirmed unsteady event list 413, on the other hand, the information on the event is deleted from the unconfirmed unsteady event list 413 and inserted to the head of the confirmed unsteady event list 412. A flag indicating that the information has not been put in a sequence of severeness is added. Then, data of the unsteady-event notifying figure for the unsteady event is deleted from the unconfirmed unsteady event display picture 403. After the data of the unsteady event has been deleted from the unconfirmed unsteady event list 413, re-drawing processing to write display data of a figure notifying the confirmed unsteady event into the confirmed unsteady event display picture 402 is carried out.

As an embodiment, there is provided a method whereby attributes are provided so that an unsteady event with a high degree of severeness is displayed at a position higher than an unsteady event with a low degree of severeness. In a monitor application, there is a case in which a number of alarms occur at the same time for an object being monitored. In this case, it may be necessary to display the alarms by overlapping one another to a certain degree so that the display is still easy to see. If alarms with a high degree of severeness are displayed at the top, the essence of the notification information can be understood with ease.

If a picture includes drawn figures and character strings of the normal-operation information, there is a case in which an unsteady-event notifying figure is displayed over the normal-operation information, inadvertently concealing the information. In this case, a mouse can be operated to move the unsteady-event notifying figure to any other position. In order to prevent the amount of drawing processing work from increasing, only the figure of an external frame enclosing the unsteady-event notifying figure is displayed while the unsteady-event notifying figure is being moved. After the figure of the external frame has been placed at a destination position, the unsteady-event notifying figure is re-drawn.

It should be noted that, even if the unsteady-event notifying figure is moved away to a separated position, the relation of the unsteady event to the object being monitored will not become confusing. This is because the string figure clearly indicates the relation with an already drawn figure.

Figure 8:
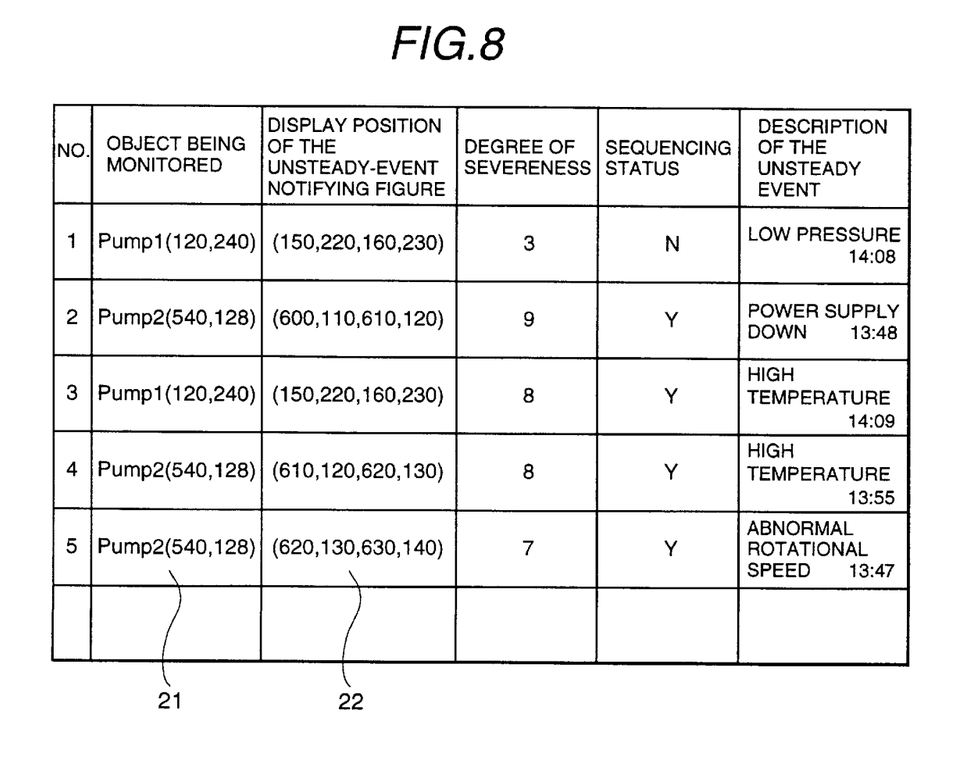
FIG. 8 is a diagram showing the structure of a list of confirmed unsteady events provided by the present invention.

FIG. 8 is a diagram showing the structure of the confirmed unsteady event list 412, a list of confirmed unsteady events. Much like the unconfirmed unsteady event list 413, each entry of the list is allocated to the occurrence of an unsteady event as shown in the figure. In addition to the description of the unsteady event, each entry includes a field 21 for describing a monitored object related to the unsteady event and the display position of the object on a screen, a field 22 for describing the drawing position of a figure notifying the occurrence of the unsteady event on the screen, the degree of severeness of the occurring unsteady event, a status of sequencing of the figure notifying the occurrence of the unsteady event and other information that is required for control purposes. Unsteady events are cataloged on the list in an order of severeness. When there is a change in the confirmed unsteady event display picture 402, the unsteady events are processed in the order they are cataloged on the confirmed unsteady event list 412. That is to say, an unsteady-event notifying figure in the first entry on the confirmed unsteady event list 412 is drawn on the outermost drawing layer of the picture.

Since the amount of calculation in sequencing processing is huge, the sequencing processing is not included in the processing of a confirming operation 435 carried out at the step 336. Information on the figure of an unsteady event right after confirmation is added to the beginning of the confirmed unsteady event list 412 by adding a flag thereto to indicate that sequencing has not been carried out. During a drawing process, this figure for the newly added information is drawn on the upper side of existing figures notifying confirmed unsteady events. If the amount of information to be processed is small, the available-time processing 322 shown in FIG. 3 is executed to move the newly added information not completing the sequencing to a proper entry in the confirmed unsteady event list 412. The figure for the newly added information is then re-drawn.

Figure 9:
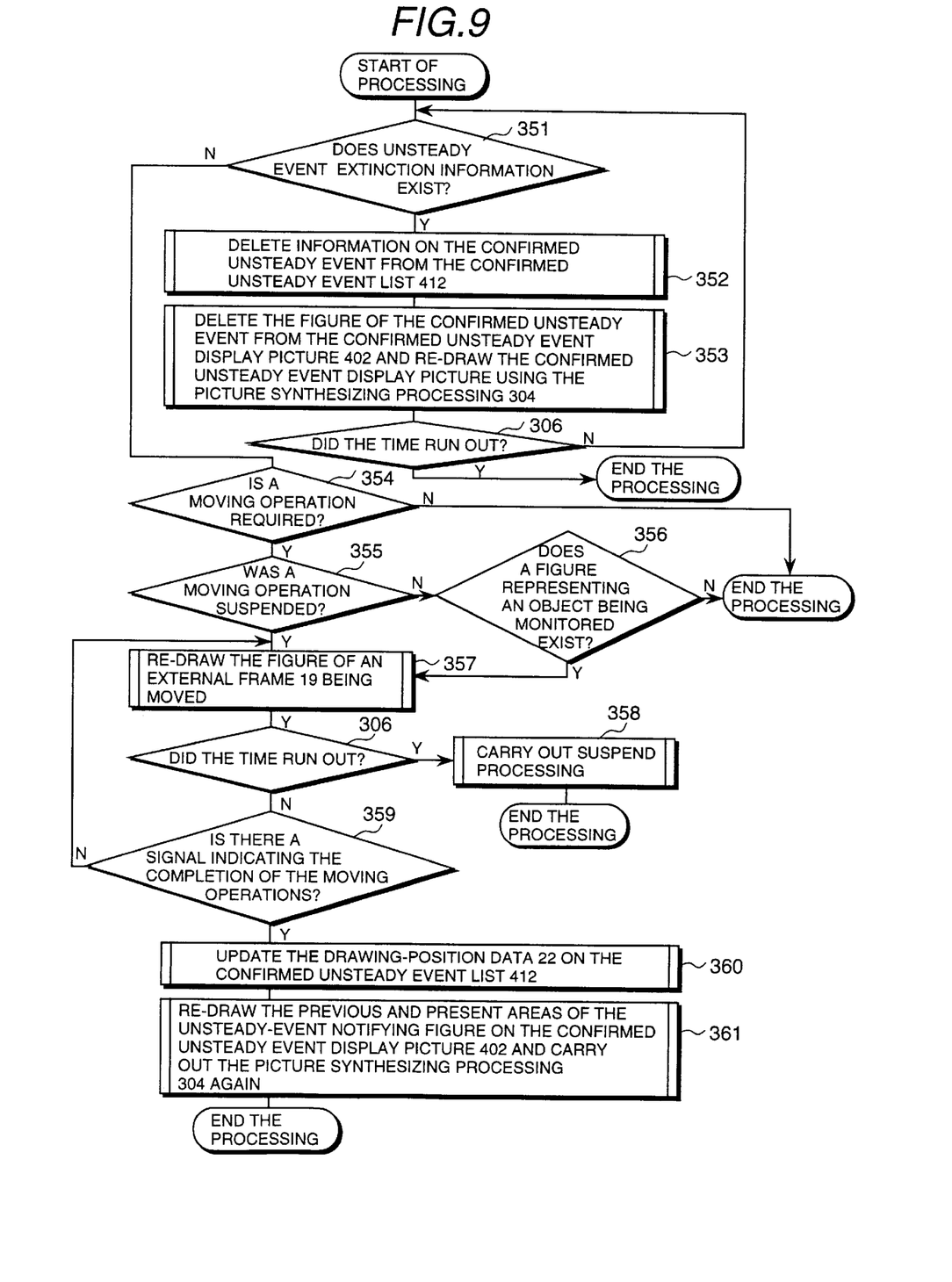
FIG. 9 is an explanatory diagram showing the flow of a procedure for processing a confirmed unsteady event provided by the present invention.

FIG. 9 is an explanatory diagram showing the flow of a procedure for the confirmed unsteady event processing 302. Once confirmed by the user, a confirmed unsteady event is regarded as an unsteady event with a low urgency. Thus, a confirmed unsteady event is processed at a low urgency in comparison with processing to display an unconfirmed unsteady event or information on normal operations. In addition, the timer 306 is set at various levels so that only processing of a confirmed unsteady event that can be completed in one period of time is carried out.

As shown in the figure, the flow begins with a step 351 to find out whether or not unsteady event extinction information 432 exits. As described earlier, the unsteady event extinction information 432 indicates that the unsteady event related to an object being monitored at the plant has disappeared. If the unsteady event extinction information 432 exits, the processing flow goes on to a step 352 at which information on the confirmed unsteady event is deleted from the confirmed unsteady event list 412. Then, the processing flow proceeds to a step 353 at which the figure of the confirmed unsteady event is deleted from the confirmed unsteady event display picture 402 and the confirmed unsteady event display picture 402 is re-drawn. The processing flow then continues to a step 306 to once check whether or not the period of time has lapsed. If the period of time has not lapsed yet, the processing flow goes on to a step 355 by way of the step 351 and a step 354 to perform moving operations. In addition to the step 355, the moving operations are carried out at the steps 356, 357 and 359. Since the moving operations are processing carried out by the user interactively, it may take a time longer than the limiting period of time assigned to the series of processings shown in FIG. 3. For this reason, the same time monitoring using the timer as the step 306 is also carried out as well in the course of the interactive processing. To be more specific, after the step 357, the processing flow proceeds to another step 306 to check whether or not the period of time has lapsed. If the time has lapsed, the processing flow goes on to a step 358 at which the moving processing is suspended by carrying out suspend processing 358. The suspend processing 358 allows the suspended moving processing to be resumed next time. If the time has not lapsed, on the other hand, the processing flow goes on to a step 359 to find out whether or not an event indicating the completion of the moving operations is detected. If the moving operations have been completed within the allocated time, the processing flow continues to a step 360 at which the drawing-position data 22 on the confirmed unsteady event list 412 is updated. The processing flow then proceeds to a step 361 at which the previous and present areas of the unsteady-event notifying figure on the confirmed unsteady event display picture 402 are re-drawn.

It should be noted that, in the re-drawing processing carried out at the step 361, the area to be re-drawn is a rectangular area including all the unsteady-event notifying figures before and after the move and the figure of a monitored object relevant to the unsteady event shown by the unsteady-event notifying figures.

Figure 10:
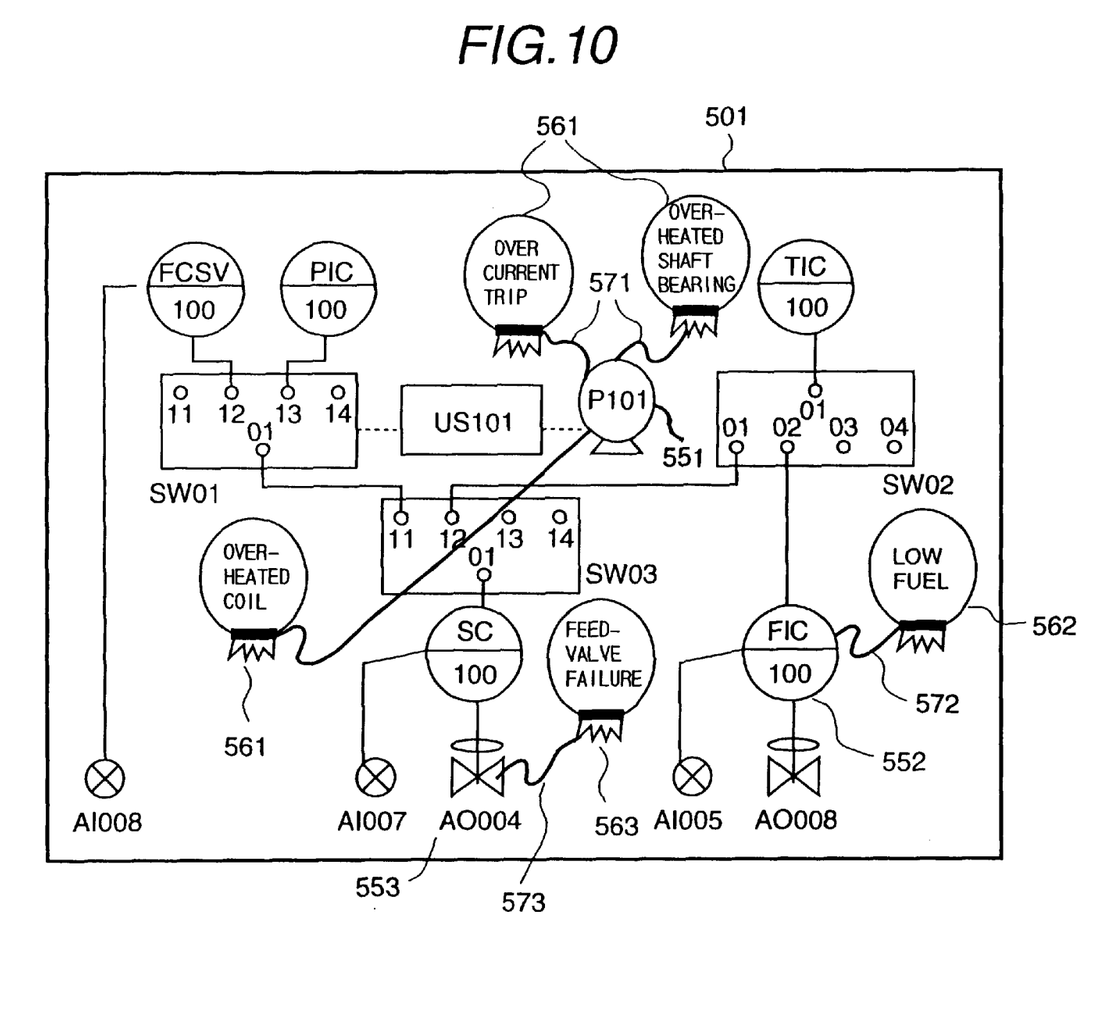
FIG. 10 is a diagram showing an example of a displayed picture provided by an embodiment of the present invention.

FIG. 10 is a diagram showing an example of a display picture 501 provided by the present invention. As shown in the figure, displayed on the plant monitoring picture 501 are a figure 551 representing a first monitored object relevant to occurring unsteady events, a figure 552 representing a second monitored object relevant to another occurring unsteady event and a figure 553 representing a third monitored object relevant to still another occurring unsteady event. The unsteady events related to the first monitored object are represented by unsteady-event notifying figures 561 whereas the unsteady event related to the second monitored object is represented by an unsteady-event notifying figure 562. As for the third monitored object, the unsteady event related thereto is represented by an unsteady-event notifying figure 563. The monitored-object figure 551 is connected to the unsteady-event notifying figures 561 by string figures 571 while the monitored-object figure 552 is connected to the unsteady-event notifying figure 562 by a string figure 572. As for the monitored-object figure 553, a string figure 573 is used to connect the unsteady-event notifying figure 563 thereto. As shown in the figure, the unsteady-event notifying figures 561, 562 and 563 each depict a balloon. Information on the occurring unsteady events represented by the unsteady-event notifying figures 561 to 563 is described in the balloon thereof. Moreover, the relations of the occurring unsteady events to their respective monitored objects are clearly indicated. In addition, the string figures 571 to 573 maintain the clear relations of the occurring unsteady events to their respective monitored objects even if the occurring unsteady events are drawn at locations separated away from the monitored objects. As a result, the unsteady-event notifying figures 561 to 563 can be drawn at locations which can be selected with a high degree of freedom, allowing a lot of information to be displayed.

It is worth noting that, while the present invention has been described with reference to some illustrative embodiments, the description is not intended to be construed in a limiting sense. That is to say, it is to be understood that the subject matter encompassed by the present invention is not limited to the embodiments. A variety of changes and modifications of the embodiments will be apparent to a person upon a study of the description. For example, instead of a balloon, a kite, a cloud or a variety of things can also be drawn as an unsteady-event notifying figure.

As described above, the present invention exhibits an effect wherein, by drawing an unsteady-event notifying figure linked to an already drawn figure on a plant monitoring picture for monitoring abnormal information, the occurrence of an unsteady event can be recognized quickly and, in addition, description of the unsteady event as well as the relation of the unsteady event to the already drawn figure can be understood with ease by the sense of sight.

What is claimed is:

1. A plant-operation-information displaying method for displaying continuously updated information input from a plant on a plant-operation monitoring picture as a set of a plurality of figures and a string of characters appended to each of said figures whereby an unsteady event occurring at said plant at an unpredictable time is reported along with a relation to one of said figures already drawn on said plant-operation monitoring picture to represent a monitored object relevant to said unsteady event, said method comprising the steps of:

drawing an unsteady-event notifying figure including an attribute determined in accordance with the substance of said occurring unsteady event and a string of characters describing the substance of said unsteady event; and drawing at the same time an associating figure showing an association of one of said figures already drawn to represent a monitored object relevant to said occurring unsteady event with said unsteady-event notifying figure, wherein said associating figure depicts a string linking said figure representing said monitored object to said unsteady-event notifying figure, and the size of said unsteady-event notifying figure is dynamically changed until a user carries out a confirming operation.

2. A plant-operation-information displaying method according to claim 1 further comprising, in the event said unsteady-event notifying figure is in a position which overlaps with any positions of already drawn figures or already displayed character strings, moving said unsteady-event notifying figure to a position different from said overlapped positions after said confirming operation is carried out by the user.

3. A plant-operation-information displaying apparatus for displaying continuously updated information input from a plant on a plant-operation monitoring picture as a set of a plurality of figures and a string of characters appended to each of said figures, said apparatus comprising:

a plant-information gathering unit for continuously inputting information coming from said plant;

a user-input processing unit for inputting confirming-operation information and moving-operation information entered by the user;

means for notifying the user of an unsteady event occurring at said plant at an unpredictable time along with a relation to one of said figures already drawn on said plant-operation monitoring picture to represent a monitored object relevant to said unsteady event;

a processing memory for storing data of three pictures: a normal-operation information picture, a confirmed unsteady event display picture and an unconfirmed unsteady event display picture;

a normal-operation information data/picture processing means, a confirmed unsteady event display data/picture processing means and an unconfirmed unsteady event display data/picture processing means for processing input data in order to create data for said normal-operation information picture, said confirmed unsteady event display picture and said unconfirmed unsteady event display picture respectively;

a data base, a confirmed unsteady event list and an unconfirmed unsteady event list storing data of said normal-operation information data/picture processing means, said confirmed unsteady event display data/picture processing means and said unconfirmed unsteady event display data/picture processing means respectively;

a normal-operation information processing wait data queue for storing a queue of pieces of normal-operation information to be output to said normal-operation information data/picture processing means;

a confirmed unsteady event processing wait data queue for storing a queue of pieces of normal-operation information, unsteady-event extinction information and moving-operation information to be output to said confirmed unsteady event display data/picture processing means;

an unconfirmed unsteady event processing wait data queue for storing a queue of pieces of normal-operation information, unsteady-event occurrence information and confirming-operation information to be output to said unconfirmed unsteady event display data/picture processing means; and a picture-synthesis processing means for drawing a final picture by synthesizing data of said normal-operation information picture, said confirmed unsteady event display picture and said unconfirmed unsteady event display picture.

4. A plant-operation-information displaying apparatus according to claim 3 wherein:

said unconfirmed unsteady event display data/picture processing means stores unsteady-event occurrence information in said unconfirmed unsteady event list, creates a picture for displaying unconfirmed unsteady events cataloged on said unconfirmed unsteady event list and, if confirming-operation information for any of said unconfirmed unsteady events is received, deletes said unsteady-event occurrence information for said unconfirmed unsteady event from said unconfirmed unsteady event list, carrying out processing to transfer said deleted information to said confirmed unsteady event list; and said confirmed unsteady event display data/picture processing means creates a picture for displaying confirmed unsteady events cataloged on said confirmed unsteady event list, if moving-operation information for any of said confirmed unsteady events is received, carries out processing to move the display of said confirmed unsteady event and, if extinction information for any of said confirmed unsteady events is received, deletes said confirmed unsteady event from data of said confirmed unsteady event display picture and said confirmed unsteady event list.

5. A plant-operation-information displaying apparatus according to claim 3 wherein:

each entry of said unconfirmed unsteady event list is created for an unconfirmed unsteady event to include a drawing position of a monitored object relevant to said unconfirmed unsteady event on a screen, a drawing position of a figure notifying said unconfirmed unsteady event on said screen, a degree of severeness of said unconfirmed unsteady event and a display state of said figure, and unconfirmed unsteady events are added to said unconfirmed unsteady event list in a chronological order of said unsteady events; and each entry of said confirmed unsteady event list is created for a confirmed unsteady event to include a drawing position of a monitored object relevant to said confirmed unsteady event on a screen, a drawing position of a figure notifying said confirmed unsteady event on said screen and a degree of severeness of said confirmed unsteady event, and confirmed unsteady events on said confirmed unsteady event list are sequenced in a severeness-degree order.

6. A plant-operation-information displaying apparatus according to claim 3 wherein said unconfirmed unsteady event display data/picture processing means:

carries out processing to draw an unsteady event after all new unsteady events waiting for processing are added to said unconfirmed unsteady event list;

determines a display position by searching said unconfirmed unsteady event display picture for an available area so as to prevent displays from overlapping each other due to said drawing processing;

carries out processing of a confirming operation; and finally, changes attributes of all figures notifying unconfirmed unsteady events in order to provide a dynamic change to each of said figures notifying unconfirmed unsteady events.

7. A plant-operation-information displaying apparatus according to claim 3 wherein said confirmed unsteady event display data/picture processing means:

deletes information on a figure notifying an unsteady event from said confirmed unsteady event list and carries out re-drawing processing when inform ation indicating extinction of said unsteady event is received;

next, carries out moving processing in accordance with a moving operation; and finally, updates said confirmed unsteady event list and carries out re-drawing processing.

* * * * *